(12) United States Patent
Lynn

(10) Patent No.: US 8,072,321 B2
(45) Date of Patent: Dec. 6, 2011

(54) TIRE PRESSURE SENSING DEVICES, SYSTEMS AND METHODS EMPLOYING AN ACOUSTIC AMPLIFIER

(75) Inventor: William David Lynn, Portrush (GB)

(73) Assignee: Schrader Electronics. Ltd., Antrim (IE)

( * ) Notice: Subject to any disclaimer, the term of this patent is extended or adjusted under 35 U.S.C. 154(b) by 312 days.

(21) Appl. No.: 12/290,278

(22) Filed: Oct. 29, 2008

(65) Prior Publication Data

US 2010/0102944 A1 Apr. 29, 2010

(51) Int. Cl.
*B60Q 1/00* (2006.01)
(52) U.S. Cl. .................. 340/451; 340/568.2; 340/693.6
(58) Field of Classification Search .......... 340/451–452, 340/566, 568.2, 582, 621, 612, 693.6, 444, 340/448
See application file for complete search history.

(56) References Cited

U.S. PATENT DOCUMENTS

| | | | | |
|---|---|---|---|---|
| 5,371,330 A | * | 12/1994 | Winbow | 181/106 |
| 5,385,069 A | * | 1/1995 | Johnson, Jr. | 73/571 |
| 6,058,768 A | * | 5/2000 | Huang | 73/146.5 |
| 2002/0167414 A1* | | 11/2002 | Kelly | 340/621 |
| 2003/0233872 A1* | | 12/2003 | Boulot | 73/146 |

FOREIGN PATENT DOCUMENTS

| | | | |
|---|---|---|---|
| DE | 10 2008 014513 A1 | | 10/2008 |
| EP | 0 301 443 | * | 7/1988 |
| EP | 0 301 443 A1 | | 2/1989 |
| EP | 1 393 933 A1 | | 3/2004 |
| EP | 1 932 689 A1 | | 6/2008 |
| JP | 2008195397 | | 8/2008 |

OTHER PUBLICATIONS

Notification of Transmittal of the International Search Report and the Written Opinion of the International Searching Authority Dated Feb. 4, 2010 for PCT/US2009/005841.

* cited by examiner

*Primary Examiner* — Daniel Previl
(74) *Attorney, Agent, or Firm* — Thomas A. Dougherty, Esq.; Jeffrey A. Thurnau, Esq.; Paul N. Dunlap, Esq.

(57) ABSTRACT

A pressure sensing device, such as a tire pressure monitoring unit comprises a pressure sensor for measuring pressure of a fluid, such as air or an inert gas, in an environment external to the device, such as within the cavity of a tire. A hollow resonator, or standing wave tube, is coupled to the pressure sensor. The resonator has a free end exposed to the external environment to the extent that pressure variations in the fluid are propagated through the hollow resonator to the pressure sensor via the free end. The hollow resonator has a resonant frequency substantially matching a target frequency such that resonance is established in the tube at the resonant frequency in response to the presence of an audio signal in the fluid having a frequency that substantially matches the target frequency.

42 Claims, 5 Drawing Sheets

TIRE PRESSURE SENSING DEVICES, SYSTEMS AND METHODS EMPLOYING AN ACOUSTIC AMPLIFIER

BACKGROUND OF THE INVENTION

1. Field of the Invention

The present invention relates to pressure sensing devices, especially for tire pressure monitoring systems, and in particular to the amplification of audio signals within tire pressure sensing devices.

2. Description of the Prior Art

A typical tire pressure monitoring (TPM) system includes a wheel-mounted unit having a pressure sensor for measuring the fluid pressure within the tire and producing an electrical signal indicative of the measured pressure. The unit also includes signal processing circuitry for processing the output signal of the pressure sensor. The output signal of the pressure sensor usually requires amplification, especially in situations where it is desired to detect relatively low amplitude components of the pressure sensor signal. In addition, the pressure sensor signal may need to be filtered. To these ends, the pressure sensor signal processing circuitry typically includes electronic amplification and filtering circuitry.

Space, weight and power consumption are important considerations in the design of the wheel-mounted unit of a TPM system and so it is desirable to simplify the signal processing circuitry. In addition, as a result of signal noise, the electronic amplification of the pressure sensor output signal can be unsatisfactory when trying to detect relatively low amplitude components of the signal.

SUMMARY

The present invention is directed to pressure sensing devices, systems and methods, especially well suited for tire pressure monitoring, which provide amplification of audio signals within the pressure sensing devices.

Various embodiments of a pressure sensing device, such as a wheel-mountable tire pressure sensing device, comprise a pressure sensor for measuring pressure of a fluid in an environment external to the device, such as air or other gas pressure in a tire cavity. These device embodiments also have a hollow resonator, which may act as an acoustic resonator and/or may be a standing wave tube. The hollow resonator is coupled to the pressure sensor, with a free end exposed to the external environment such that pressure variations in the fluid are propagated through the hollow resonator to the pressure sensor via the free end. Preferably, the hollow resonator has a resonant frequency that substantially matches a target frequency, such that resonance is established in the tube at the resonant frequency in response to the presence of a signal in the fluid having a frequency that substantially matches the target frequency.

The pressure sensor may be located within a housing, and the hollow resonator may be, at least partially, incorporated into the housing. Additionally or alternatively, at least part of the tube comprising the resonator may be coiled within the housing.

A barrier may be provided at, or adjacent to, the free end. Such a barrier may inhibit ingress of debris into the resonator, while permitting pressure variations in the fluid to be propagated into the resonator. The barrier may extend transversely across the resonator, and may be formed from a material that is porous to the fluid, the fluid being air or other gas in the case of a tire pressure sensing device, or the barrier may be formed from a material that is non-porous to the fluid and is adapted to flex to propagate the pressure variations into the resonator. Alternatively, the barrier may extend substantially longitudinal of the resonator. For example, the barrier may be a pin disposed in the resonator. As a further alternative, a part of the hollow resonator adjacent the free end may include a tube portion that is non-parallel, but rather substantially perpendicular, with a preceding part of the hollow resonator. In such embodiments, a portion of the resonator adjacent the free end may be orientated so that, in use, centrifugal force, such as created when a wheel is rolling urges matter out of the free end of the resonator.

Thus, embodiments of a method of operation of a wheel-mountable tire pressure sensing device in accordance with the present invention might include coupling a hollow resonator having a resonant frequency to a tire pressure monitoring sensor within a tire cavity, as discussed above, such that a free end of the resonator is exposed to the tire cavity. In such embodiments variations in gas pressure in the tire cavity may be propagated, via the free end, through the hollow resonator to the pressure sensor, thereby establishing resonance in the hollow resonator at the resonant frequency in response to the presence of an audio signal in the gas in the tire cavity. A determination may be made as to whether a vehicle in which a tire unit housing the tire pressure sensor is installed is moving, at least at a predetermined speed, by detecting the resonance at the sensor. Further, the unit in which the tire pressure monitoring sensor is installed may be operated in response to such a determination of motion, or lack thereof. For example, transmission of tire pressure information may be initiated or curtailed, in response to motion of said vehicle above or below said predetermined speed, respectively.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
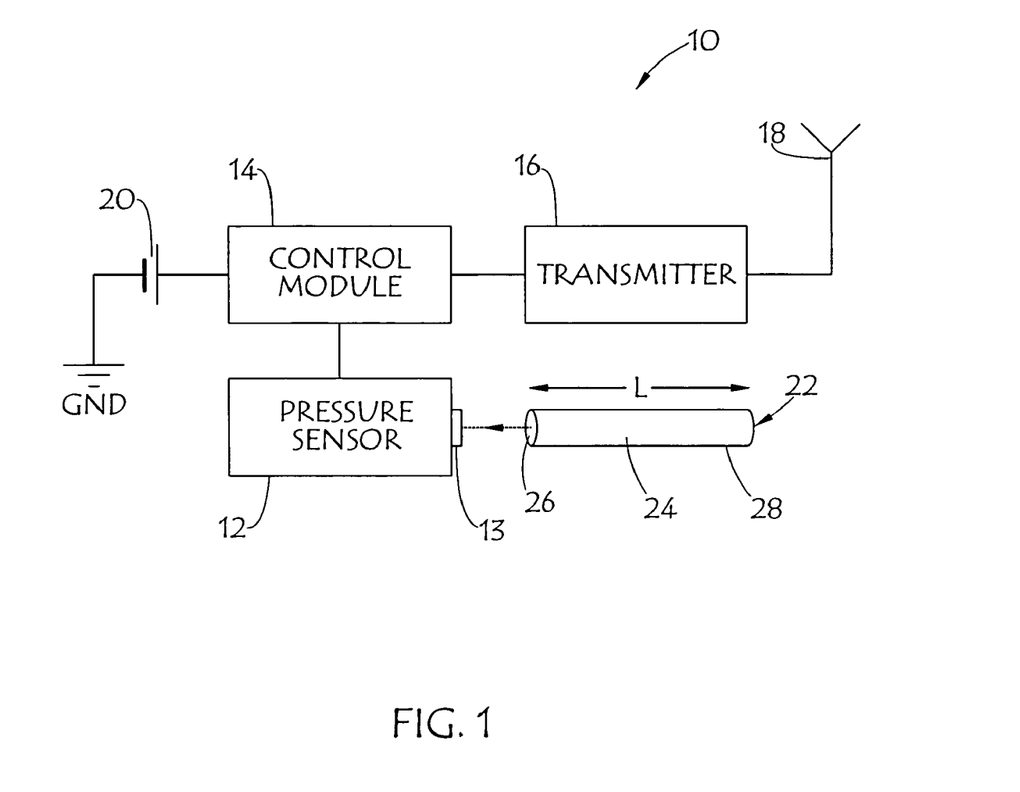
FIG. 1 is a diagrammatic illustration of an embodiment of a wheel-mountable tire pressure sensing device of the present invention, suitable for use in a tire pressure monitoring (TPM) system.

Referring now to FIG. 1 of the drawings, there is shown, generally indicated as 10, a block diagram of a tire pressure sensing device embodying aspects of the present invention, suitable for use in a tire pressure monitoring (TPM) system. Pressure sensing device 10 is, during use, installed inside the pneumatic tire of a vehicle's wheel (not shown) and may be referred to as wheel unit 10. Wheel unit 10 is referred to herein as "wheel-mountable," or the like. One of ordinary skill in the art will appreciate that such a wheel unit may be mounted directly to a wheel, such as by being secured to the interior extent of a valve stem or otherwise disposed proximate to the rim using for example an adhesive, or a band extending longitudinally or transversely of the rim. Alternatively, the wheel unit may be adhered or otherwise secured in the interior of a tire, with the tire in-turn mounted on a wheel.

Wheel unit 10 comprises pressure sensor 12 for measuring the pressure of the fluid, typically air, or in some cases an inert gas such as nitrogen, inside the tire. Pressure sensor 12 may take any suitable conventional form, for example a piezoresistive silicon sensor, a capacitive pressure sensor, or a transducer for converting pressure into an electrical signal.

Control module 14 is provided for controlling the operation of pressure sensor 12 and for processing its output. Typically, control module 14 periodically causes pressure sensor 12 to measure fluid pressure and to return a corresponding electrical signal. Control module 14 typically includes signal processing circuitry (not shown) for amplifying and/or filtering the output signal. It may also perform other processing operations such as temperature compensation, although such processing may alternatively be performed elsewhere in the TPM system, such as in a central receiver. A suitably programmed microprocessor (not shown), or other programmable controller, is normally included in control module 14 for controlling the operation of module 14 and for performing signal processing as required. Control module 14 may for example be implemented in an Application Specific Integrated Circuit (ASIC).

Control module 14 determines a pressure value from the output of pressure sensor 12 and causes the measured value to be transmitted to a remote monitoring unit (not shown) via transmitter 16 and antenna 18. Transmitter 16 may take any suitable form, usually an RF transmitter operating with, for example, a UHF carrier at, say, 300-450 MHz. Antenna 18 may be selected accordingly and may be incorporated into a valve stem associated with wheel unit 10. The remote monitoring unit, which constitutes another part of the TPM system and which may typically be referred to as a receiver, may perform additional processing as required and causes the measured tire pressure, and/or related information such as a warning signal, to be displayed to a user via a display device (not shown) that may be provided on the instrument panel of the vehicle.

An electrical power source, usually in the form of battery 20, is provided to supply electrical power to wheel unit 10. However, wheel unit 10 may be "self-powered," such as through the use of a piezoelectric device that converts mechanical energy in the tire into electric energy.

In addition to measuring tire pressure, it may be desirable that wheel unit 10 determine whether or not the output signal from pressure sensor 12 includes one or more signal components that are, for example, indicative of certain events. In particular, in accordance with the present invention, it has been found that when a wheel (not shown) is in rolling contact with a ground surface, the interaction of the wheel's tire and the ground surface generates vibrations that cause relatively small fluctuations in the fluid pressure within the tire. The vibrations produce a resonance in the tire that can be detected by pressure sensor 12. This resonance, for normal road surfaces and normal vehicle tires, has been found to usually be present in the range 200 Hz to 300 Hz, commonly in the range 220 Hz to 290 Hz, and most usually at approximately 250 Hz. In such cases, the signal generated by the tire vibrations may be said to comprise an audio signal or acoustic resonance. Pressure sensor 12 preferably detects the audio signal when it measures the fluid pressure in the tire. As a result, the output signal of pressure sensor 12 might include one or more signal components representing the audio signal. By way of example only, for normal vehicle tires and road surfaces, a pressure sensor having an output sensitivity in the range of 50 μV to 200 μV corresponding to a detected pressure in the region of 30 mpsi would be suitable for detecting the audio signal component.

In accordance with the present invention, by detecting whether or not the audio signal component is present in the output of pressure sensor 12, wheel unit 10 may be able to determine whether or not the vehicle in which it is installed is moving. This in turn allows wheel unit 10 to be selective about when it transmits and/or otherwise operates in order to conserve power. For example, transmission of tire pressure information may be made in response to a determination that the vehicle is in motion (above a predetermined speed) and/or such transmissions may be curtailed upon a determination that the vehicle is not in motion (or has not been in motion for some time.

The audio signal is typically present at relatively low amplitudes, thus it may be desirable to amplify the audio signal to make it more detectable. One option is to provide an electronic amplifier in control module 14 for this purpose. However, as a result of relatively high noise levels, electronic amplification might be unsatisfactory. In addition, electronic filtering circuitry can be provided in control module 14 to facilitate detection of the audio signal. However, the provision of additional electrical/electronic circuitry for the detection of the audio signal might be undesirable in view of the space that it requires and the power that it consumes.

In order to facilitate the detection of one or more signals, in particular pressure signals, present in the fluid within the tire, wheel unit 10 includes standing wave tube 22, sometimes referred to as a resonance tube, having tube body 24 of length L with first and second ends 26, 28. One end 26 is coupled to the pressure sensing input component 13 (typically a pressure sensitive membrane or disc) of pressure sensor 12. The other (free) end 28, in use, being exposed to the cavity of the tire, such that pressure variations in the cavity may be transmitted or propagated, directly or indirectly, through tube 22, via end 28. Thus, end 28 is preferably open, but need not necessarily be so, as is described in more detail hereinafter. Tube body 24 is preferably hollow and has an internal transverse cross section that is, preferably, substantially uniform along its length. The internal transverse cross section of tube body 24 is preferably, but not necessarily, substantially circular in shape. Conveniently, end 26 may be fitted directly onto pressure sensor 12, preferably with a seal (not shown) to facilitate a substantially sealing engagement between the two.

In use, the fluid inside tube 22 resonates when excited by an audio signal at a resonant frequency of tube 22. This causes a standing wave to be established in the fluid between ends 26, 28 of the tube. Tube 22 may have more than one resonant frequency and so may cause resonance at different frequencies. However, in the present example, it is assumed that it is desired to detect the presence of, or otherwise sense an audio signal in the tire cavity at, or approximately at, a selected target frequency. Hence, tube 22 is adapted such that its fundamental resonating frequency matches the selected target frequency of the audio signal that it is desired to detect. In practice, tube 22 is usually capable of facilitating the detection of signals in a relatively narrow frequency band around the main resonant frequency. Adapting tube 22 to cause resonance at a selected frequency primarily involves selecting an appropriate length L of tube 22, although other factors, such as the width, or diameter, of tube 22, or the transverse cross-sectional shape of the tube also have an effect on the resonant frequency.

Tube 22 itself is typically open at both ends 26, 28, although end 26 is closed by pressure sensor 12 during use. Hence, the resonant frequency of tube 22 may be determined by the following equation:

$$F = Vn/4L \quad [1]$$

Where F is the resonant frequency, V is the velocity of sound in the subject fluid (such as air or other gas in a tire), n is the harmonic number (which is assumed to be 1 in this example) and L is the length of tube 22. A more accurate calculation of the resonant frequency can be made by taking the diameter, or width, of tube 22 into account. This can be achieved by replacing the length L in equation [1] by the effective length $L_{EFF}$, where $L_{EFF} = L + 0.3 D$, and where D is the diameter, or width, of tube 22.

By way of example, assuming that it is desired to detect acoustic signals at a frequency of approximately 250 Hz, the length L of tube 22 may be approximately 340 mm. An optimum diameter D of tube 22 is approximately 4 mm, although because of space restrictions, a smaller diameter of approximately 2 mm may be preferred.

In accordance with the foregoing, tube 22 preferably serves as a mechanical amplifier, adapted to amplify signals present in the fluid within the tire cavity at a selected frequency. Tube 22 also acts as a mechanical filter, adapted to pass signals at the selected frequency. In various embodiments, tube 22 may be tuned to detect acoustic resonance within the tire by causing corresponding acoustic resonance in the fluid within tube 22. As such, tube 22 may be said to serve as an acoustic amplifier and acoustic filter.

The standing waves established in tube 22 when resonance occurs is preferably readily detectable by pressure sensor 12. This eliminates, or at least reduces the complexity of, electronic amplification and filtering circuitry that might be used in control module 14 for detecting the audio signal.

Figure 2:
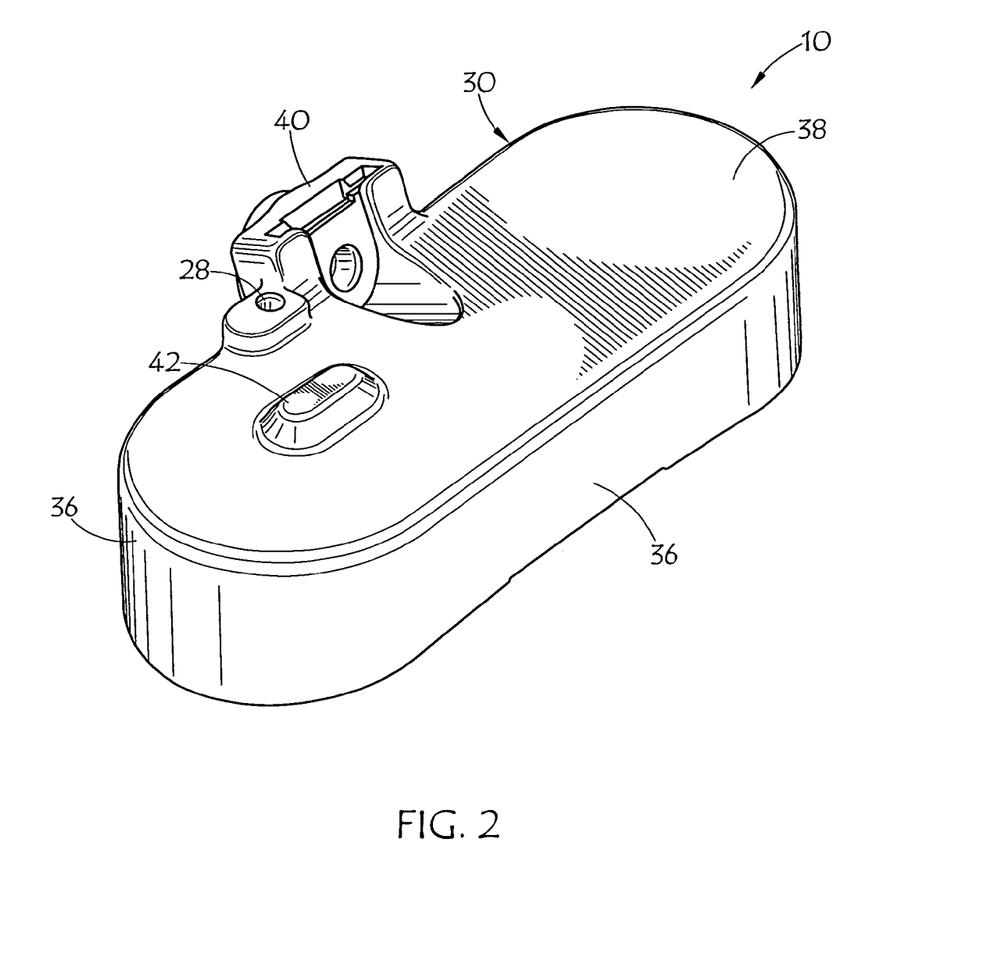
FIG. 2 is a perspective view of the device of FIG. 1.
Figure 3:
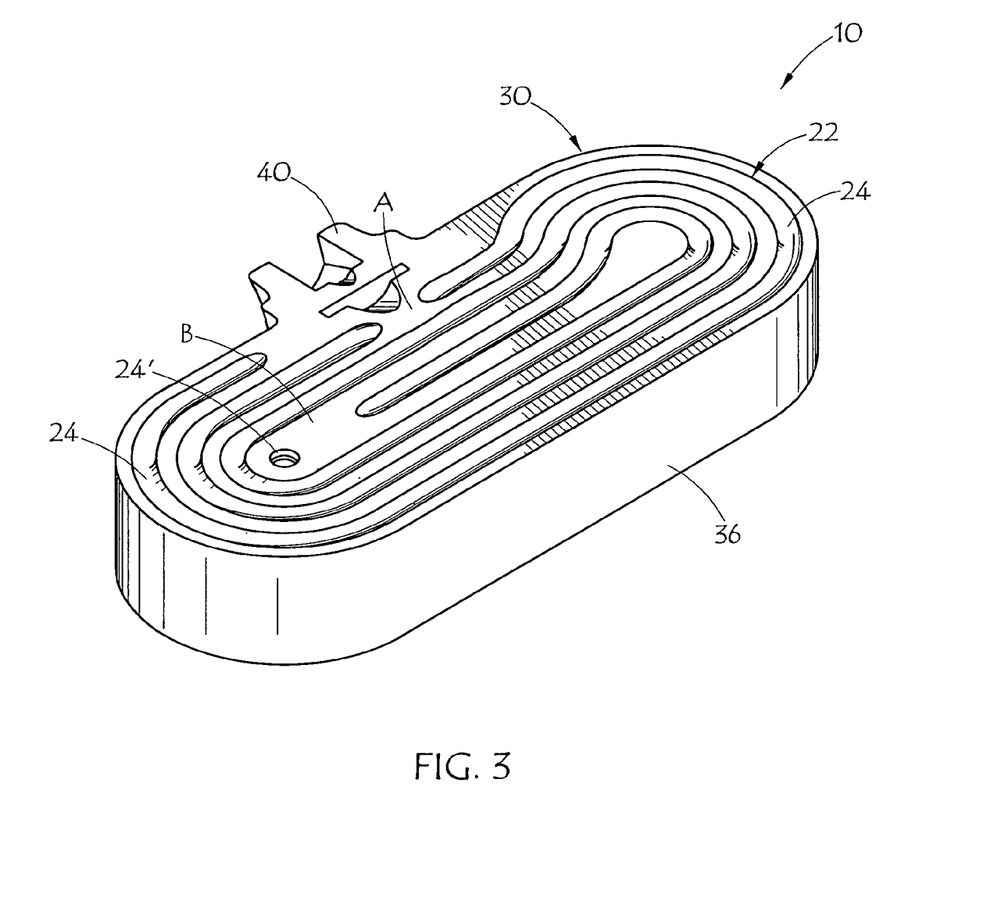
FIG. 3 is a partially fragmented perspective view of the device of FIG. 2.
Figure 4:
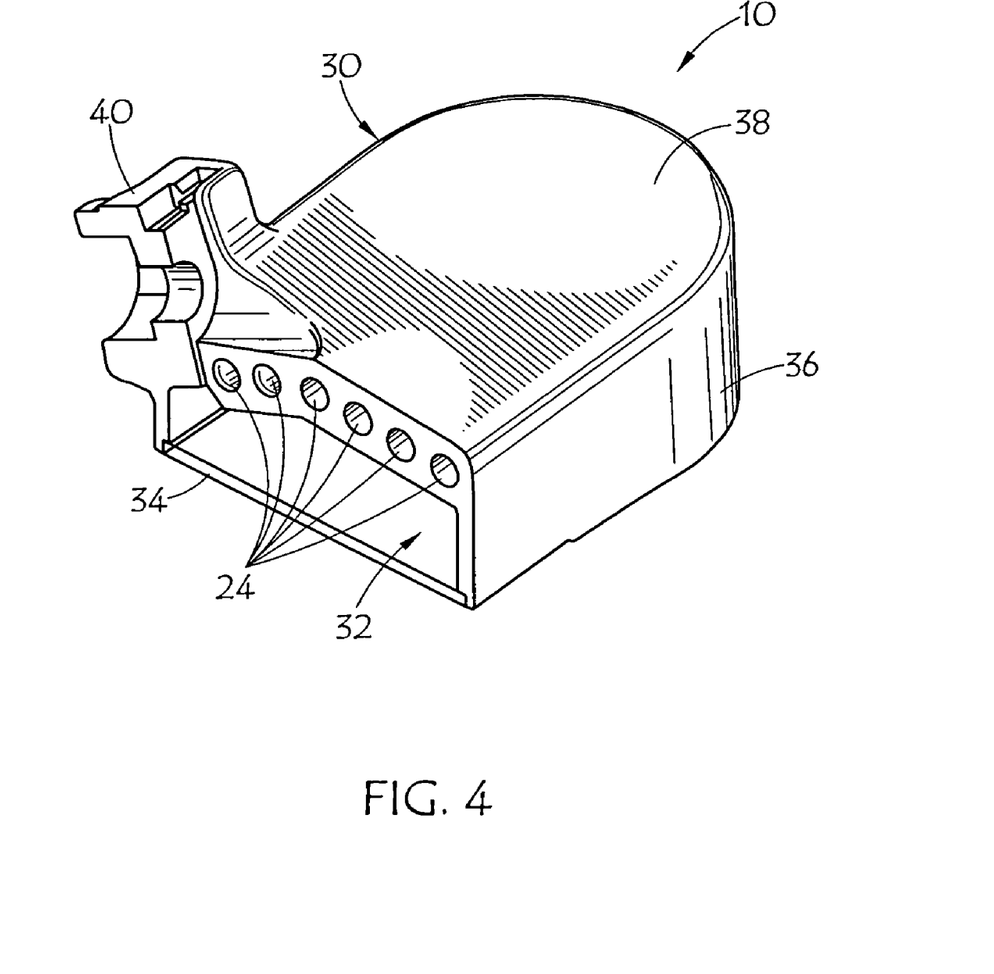
FIG. 4 is an alternative partially fragmented perspective view of the device of FIG. 2.

Referring now to FIGS. 2 to 4, there is shown perspective views of an embodiment of wheel unit 10. Unit 10 comprises housing 30 shaped to define an internal cavity 32 for receiving pressure sensor 12, control module 14, transmitter 16, antenna 18, battery 20, together with any other components that may be employed by unit 10 and are not described herein for reasons of clarity and brevity. Housing 30 has a plurality of walls, including base 34, which typically carries a printed circuit board (PCB) (not shown), or other substrate, on which the internal components of unit 10 can be mounted, one or more side walls 36 (depending on the shape of housing 30) and cover 38. In the illustrated embodiment, cover 38 and side walls 36 are integrally formed and together provide a lid for fitting to base 34. The lid may be removable, or may be fixed in position after fitting. Housing 30 may be formed from any suitable material, e.g. plastics, rubber, nylon, glass filled nylon, etc.

Typically, housing 30 includes mounting 40 for receiving a valve (not shown) for inflating or deflating the tire. Mounting 40 may be integrally formed with the housing or fixed to the housing by any suitable means, and may provide a coupling between a valve stem antenna and transmitter 16.

In various embodiments, tube 22 may be incorporated into housing 30. In the illustrated embodiment, tube 22 is incorporated into cover 38. Free end 28 of tube 22 is exposed to the external environment of unit 10 and so, in use, is exposed to the tire cavity (not shown). End 28 is typically open, but it may alternatively be wholly or partially closed by a membrane or other device (not shown). In any event, end 28 is exposed to the tire cavity in use to the extent that pressure fluctuations in fluid in the tire cavity are propagated into tube 22, via end 28. Other end 26 of tube 22 is not visible in FIGS. 2 to 4, but is located inside housing cavity 32, coupled to pressure sensor 12.

Between ends 26, 28, tube body 24 of tube 22 runs through cover 38. Because of restrictions on the size of housing 30, tube body 24 of tube 22 is coiled within cover 38, as may best be seen from FIG. 3. In the illustrated embodiment, coiled body 34 generally lies in a plane that is substantially co-incident with the plane in which cover 38 lies.

As illustrated in FIG. 3, in region A, tube body 24 is diverted downwardly to accommodate mounting 40. In region B, tube body 24 is diverted upwardly to allow an end section 24' of tube body 24 to subsequently extend substantially perpendicularly into cavity 32. This facilitates coupling of tube 22 to pressure sensor 12. The upward diversion of tube 22 results in protrusion 42 in cover 38 (FIG. 2).

Figure 5A:
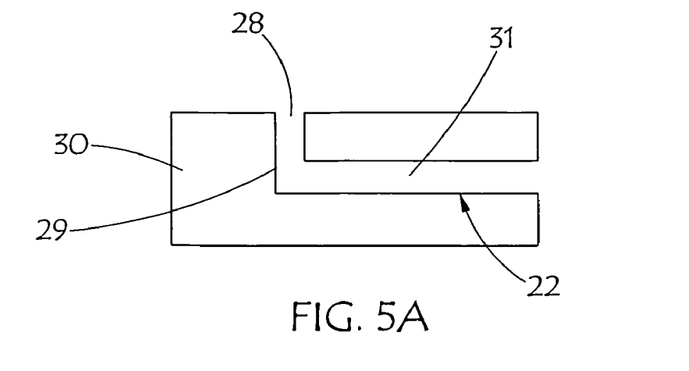
FIGS. 5A to 5C are fragmentary diagrams of part of the device of FIG. 1.
Figure 5B:
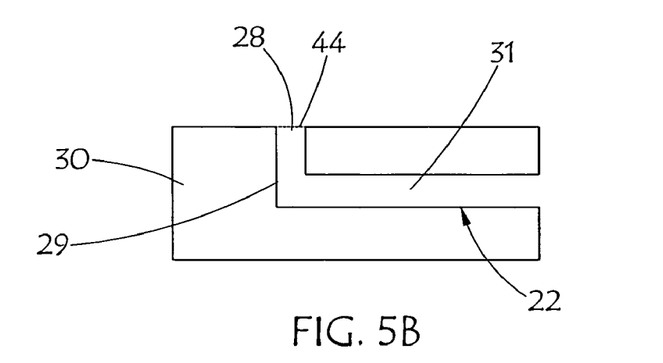
Figure 5C:
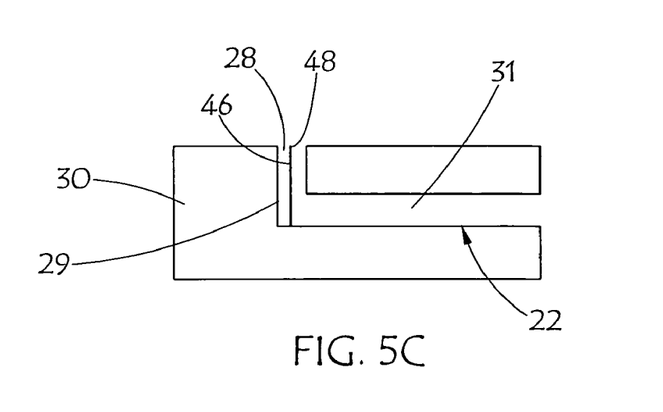

Referring in particular to FIGS. 5A to 5C, in order to reduce the likelihood that end 28 of tube 22 becomes clogged with debris, it may be preferred to arrange tube 22 such that an end section 29 of tube 22 adjacent end 28 is disposed in a direction that facilitates the removal of debris from end section 29. In particular, end section 29 is disposed in the direction of centrifugal force when the vehicle is moving, with end 28 facing away from the direction of forward travel. It also may be preferred that end section 29 is non-parallel with adjacent portion 31 of tube 22 to inhibit ingress of debris beyond end section 29.

FIG. 5B illustrates that transversely disposed barrier 44 may be provided at or adjacent end 28 of tube 22 to prevent or reduce the ingress of debris. Barrier 44 may be formed from a material that is porous to the subject fluid, e.g. gauze, neoprene, Gore-Tex®, or other open weave or reticulated material, or a material that is non-porous to the subject fluid. In cases where the material is non-porous to the extent that it would impede the operation of tube 22, the material should exhibit a low resistance to acoustic pressure waves. For example, the barrier may comprise a flexible membrane or diaphragm that is capable of transmitting or propagating acoustic pressure signals from the tire cavity into fluid within tube 22.

FIG. 5C illustrates that longitudinally disposed barrier 46 may be provided in end section 29 of tube 22. Barrier 46 may for example take the form of a pin or plate, free end 48 of barrier 46 preferably being located substantially at end 28 of tube 22. Barrier 46, which is preferably substantially centrally located in end section 29, restricts the size of objects that can enter tube 22 without unduly affecting the operation of tube 22.

Tube 22 need not necessarily be incorporated into cover 38. It may alternatively, or in addition, be incorporated into other parts of the housing, especially its walls. Tube 22 may be incorporated into housing 30 in any convenient manner. For example, it may be pre-formed as a separate entity and inserted into a suitable channel provided in the housing, it may be pre-formed and over-molded with the housing, or it might be preformed and appended to the housing, such as through the use of adhesives or the like. Alternatively, it may be formed directly in housing 30, for example by providing two parts of the housing with a respective open channel that form tube 22 when brought together.

In operation, embodiments of wheel-mountable tire pressure sensing unit 10 couple hollow resonator 22 to a tire pressure monitoring sensor 12, as discussed above, such that free end 28 of resonator 22 is, at least in effect, exposed to the tire cavity. In such embodiments, variations in fluid pressure in the tire cavity may be propagated, via free end 28, through hollow resonator 22 to pressure sensor 12. Preferably, in response to the presence of an audio signal in the fluid in the tire cavity, such as may occur during movement of the tire's vehicle, resonance is established in the hollow resonator, at a target frequency, which is preferably the resonant frequency of resonator 22. A determination may be made as to whether the vehicle is moving, at least at a predetermined speed, by detecting the resonance at sensor 12. Further, unit 10 may be operated in response to such a determination of the presence or absence of motion. For example, as mentioned above, transmission of tire pressure information may be made in response to a determination that the vehicle is in motion, particularly in motion at a speed above a predetermined threshold. Conversely, transmissions may be curtailed upon a determination that the vehicle is not in motion. Such a curbing of transmissions may only be made after the vehicle has been stopped for a predetermined period of time, such that it would indicate the vehicle has been parked.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A pressure sensing device comprising:
   a pressure sensor for measuring pressure of a fluid in an environment external to said pressure sensing device; and
   a hollow resonator coupled to the pressure sensor and having a free end exposed to said external environment where pressure variations in said fluid are propagated through the hollow resonator to the pressure sensor via said free end, said hollow resonator having a resonant frequency substantially matching a target frequency where resonance is established in said hollow resonator at said resonant frequency in response to the presence of a signal in said fluid having a frequency substantially matching said target frequency.

2. The pressure sensing device as claimed in claim 1, wherein said hollow resonator comprises an acoustic resonator.

3. The pressure sensing device as claimed in claim 1, wherein said hollow resonator comprises a standing wave tube having a first end and said free end, said first end coupled to the pressure sensor.

4. The pressure sensing device as claimed in claim 1, wherein said pressure sensor is located within a housing, and said hollow resonator is at least partially incorporated into said housing.

5. The pressure sensing device as claimed in claim 4, wherein at least part of said hollow resonator comprises a tube and at least part of said tube is incorporated into said housing.

6. The pressure sensing device as claimed in claim 5, wherein said at least part of said tube is coiled within said housing.

7. The pressure sensing device as claimed in claim 1, wherein a barrier is provided in said hollow resonator adjacent, said free end, said barrier inhibiting ingress of debris into the resonator and permitting pressure variations in said fluid to be propagated into said hollow resonator.

8. The pressure sensing device as claimed in claim 7, wherein said barrier extends transversely of the resonator and is formed from a material that is porous to said fluid.

9. The pressure sensing device as claimed in claim 7, wherein said barrier extends transversely of the resonator and is formed from a material that is non-porous to said fluid and is adapted to flex to propagate said pressure variations into said hollow resonator.

10. The pressure sensing device as claimed in claim 7, wherein said barrier extends substantially longitudinally of the resonator.

11. The pressure sensing device as claimed in claim 10, wherein said barrier comprises a pin.

12. The pressure sensing device as claimed in claim 1, wherein a part of said hollow resonator adjacent said free end comprises a tube that is non-parallel, and substantially perpendicular, with a preceding part of said hollow resonator.

13. The pressure sensing device as claimed in claim 1, wherein said device is incorporated into a wheel-mountable unit of a tire pressure monitoring system, and measures the pressure of a fluid contained within the tire cavity.

14. The pressure sensing device as claimed in claim 13, wherein a portion of said hollow resonator adjacent said free end is orientated so that, in use, centrifugal force created when said wheel is rolling urges matter out of the free end of the resonator.

15. The pressure sensing device as claimed in claim 13, wherein said resonant frequency and said target frequency are in the range of 200 to 300 Hz.

16. The pressure sensing device as claimed in claim 13, wherein said resonant frequency and said target frequency are approximately 250 Hz.

17. A wheel-mountable tire pressure sensing device comprising:
    a pressure sensor for measuring pressure in a tire cavity; and
    a hollow acoustic resonator coupled to the pressure sensor, said hollow acoustic resonator comprising a free end exposed to said tire cavity, where pressure variations in said tire cavity are propagated through the hollow acoustic resonator to the pressure sensor, via said free end, said resonator having a resonant frequency substantially matching a target frequency where resonance is established in said hollow acoustic resonator at said resonant frequency in response to the presence of an audio signal in said tire cavity having a frequency that substantially matches said target frequency.

18. The wheel-mountable tire pressure sensing device as claimed in claim 17, wherein said pressure sensor is located within a housing, and said resonator is at least partially incorporated into said housing.

19. The wheel-mountable tire pressure sensing device as claimed in claim 18, wherein at least part of said resonator comprises a tube and at least part of said tube is coiled within said housing.

20. The wheel-mountable tire pressure sensing device as claimed in claim 17, wherein a barrier is provided in said resonator adjacent said free end, said barrier inhibiting ingress of debris into the resonator and permitting pressure variations to be propagated into said resonator.

21. The wheel-mountable tire pressure sensing device as claimed in claim 20, wherein said barrier extends transversely of the resonator and is formed from a material that is porous to fluid in said tire cavity.

22. The wheel-mountable tire pressure sensing device as claimed in claim 21, wherein said barrier extends transversely of the resonator and is formed from a material that is non-porous to said fluid and is adapted to flex to propagate said pressure variations into said resonator.

23. The wheel-mountable tire pressure sensing device as claimed in claim 20, wherein said barrier extends substantially longitudinally of the resonator.

24. The wheel-mountable tire pressure sensing device as claimed in claim 17, wherein a portion of said resonator adjacent said free end is orientated so that, in use, centrifugal force created when said wheel is rolling urges matter out of the free end of the resonator.

25. The wheel-mountable tire pressure sensing device as claimed in claim 17, wherein said resonant frequency and said target frequency are in the range of 200 to 300 Hz.

26. The wheel-mountable tire pressure sensing device as claimed in claim 17, wherein said resonant frequency and said target frequency are approximately 250 Hz.

27. A method comprising:
coupling a hollow resonator having a resonant frequency to a tire pressure monitoring sensor within a tire cavity;
exposing a free end of said hollow resonator to said tire cavity;
propagating variations in fluid pressure in said tire cavity through the resonator to the pressure sensor, via said free end; and
establishing resonance in said resonator at said resonant frequency in response to the presence of an audio signal in said fluid in said tire cavity.

28. The method of claim 27, further comprising:
incorporating at least a portion of said resonator into a housing said pressure sensor.

29. The method of claim 28, wherein said incorporating further comprises coiling at least a portion of said resonator within said housing.

30. The method of claim 27, further comprising:
disposing a barrier at said free end, inhibiting ingress of debris into said resonator and permitting said variations in fluid pressure to be propagated to said sensor.

31. The method of claim 30, wherein said barrier is formed from a material that is porous to said fluid.

32. The method of claim 30, wherein said barrier is formed from a material that is non-porous to said fluid and is adapted to flex to propagate said variations in fluid pressure into said resonator.

33. The method of claim 30, wherein said disposing comprises disposing a pin in said free end 34. The method of claim 27, further comprising:
orienting a portion of said resonator adjacent said free end generally aligned with centrifugal force created when a wheel in which said sensor and resonator are disposed is rolling to urge matter out of the free end of the resonator.

35. The method of claim 27, further comprising:
determining whether a vehicle in which said tire pressure monitoring sensor is installed is moving by detecting said resonance at said sensor.

36. The method of claim 35, further comprising:
operating a tire pressure monitoring unit in which said tire pressure monitoring sensor is installed in response to said determining.

37. The method of claim 36, wherein said operating a tire pressure monitoring unit in response to said determining comprises controlling transmission of tire pressure information in response to motion of said vehicle.

38. The method of claim 36, wherein said resonant frequency is approximately 250 Hz.

39. The method of claim 27, further comprising:
determining whether a vehicle in which said tire pressure monitoring sensor is installed is moving at least at a predetermined speed by detecting said resonance at said sensor.

40. The method of claim 39, further comprising:
operating a tire pressure monitoring unit in which said tire pressure monitoring sensor is installed in response to said determining.

41. The method of claim 40, wherein said operating a tire pressure monitoring unit in response to said determining comprises controlling transmission of tire pressure information in response to motion of said vehicle above or below said predetermined speed.

42. The method of claim 27, wherein said resonant frequency is in the range of 200 to 300 Hz.

* * * * *